US010065058B2

(12) United States Patent
Sepe et al.

(10) Patent No.: US 10,065,058 B2
(45) Date of Patent: Sep. 4, 2018

(54) TOLERANCE RING IN EXTERNAL ENERGY ABSORBER

(71) Applicant: MSA Technology, LLC, Cranberry Township, PA (US)

(72) Inventors: Benjamin T. Sepe, Pittsburgh, PA (US); Karl Jones, Wiltshire (GB)

(73) Assignee: MSA Technology, LLC, Cranberry Township, PA (US)

(*) Notice: Subject to any disclaimer, the term of this patent is extended or adjusted under 35 U.S.C. 154(b) by 0 days.

(21) Appl. No.: 15/392,369

(22) Filed: Dec. 28, 2016

(65) Prior Publication Data
US 2018/0178046 A1 Jun. 28, 2018

(51) Int. Cl.
| A62B 35/04 | (2006.01) |
| F16D 59/00 | (2006.01) |
| F16D 65/08 | (2006.01) |
| A62B 1/10 | (2006.01) |

(52) U.S. Cl.
CPC ............. *A62B 35/04* (2013.01); *F16D 59/00* (2013.01); *A62B 1/10* (2013.01); *F16D 65/08* (2013.01)

(58) Field of Classification Search
CPC .......... F16D 59/00; F16D 65/04; F16D 65/08; F16D 2069/004; A62B 1/06; A62B 1/08; A62B 1/10; A62B 35/04; A62B 35/0093
USPC .... 188/64, 65.1, 68, 83, 180, 184, 185, 188, 188/271; 182/234, 235
See application file for complete search history.

(56) References Cited

U.S. PATENT DOCUMENTS

| 492,180 | A | * | 2/1893 | Athey | ...................... | A62B 1/10 |
| | | | | | | 182/235 |
| 2,859,919 | A | * | 11/1958 | Le Clement | ............. | G03B 1/40 |
| | | | | | | 188/67 |
| 3,271,005 | A | * | 9/1966 | Jones | .................... | F01D 21/006 |
| | | | | | | 188/184 |
| 3,420,503 | A | * | 1/1969 | Stangl | ...................... | A62B 1/10 |
| | | | | | | 182/235 |
| 3,895,694 | A | * | 7/1975 | Muntjanoff | ............. | B66C 3/005 |
| | | | | | | 188/83 |
| 2014/0251730 | A1 | * | 9/2014 | Bisset | ................... | E01D 19/106 |
| | | | | | | 182/150 |
| 2014/0251731 | A1 | * | 9/2014 | Jones | ..................... | A62B 35/04 |
| | | | | | | 182/231 |

FOREIGN PATENT DOCUMENTS

| WO | 2013061087 A2 | 5/2013 |
| WO | 2016120614 A1 | 8/2016 |

* cited by examiner

*Primary Examiner* — Thomas J Williams
(74) *Attorney, Agent, or Firm* — The Webb Law Firm (57) ABSTRACT

An external energy absorber may include a hub having a line associated therewith, the line including a first end directly or indirectly attached to the hub and a second end opposite the first end attached to a user, an energy absorbing arrangement directly or indirectly attached to the hub, the energy absorbing arrangement comprising an outer ring directly or indirectly attached to the hub, an inner ring directly or indirectly attached to a housing, and at least one energy absorbing member positioned between the outer ring and the inner ring, wherein the at least one energy absorbing member is configured to generate friction between the outer ring and the inner ring upon rotation of the hub, and the housing configured to hold the hub and energy absorbing arrangement.

16 Claims, 12 Drawing Sheets

TOLERANCE RING IN EXTERNAL ENERGY ABSORBER

BACKGROUND OF THE INVENTION

Field of the Invention

The present invention relates generally to fall protection safety devices and, in particular, to an external energy absorber having a tolerance ring configured to provide a controlled amount of friction to absorb energy generated between two surfaces in the external energy absorber.

Description of Related Art

A fall protection device may be used in a variety of situations and applications, such as for fall protection in industrial environments, as well as in connection with recreational activities. Fall protection devices have numerous industrial end uses, including, but not limited to, construction, manufacturing, hazardous materials/remediation, asbestos abatement, spray painting, sand blasting, welding, mining, numerous oil and gas industry applications, electric and utility, nuclear energy, paper and pulp, sanding, grinding, stage rigging, roofing, scaffolding, telecommunications, automotive repair and assembly, warehousing, and railroading.

In many fall protection situations, users at heights often rely on fall protection devices to dissipate the energy experienced during an unexpected fall. One type of fall protection device is in the form of a lanyard, such as a self-retracting lanyard (SRL), which is commonly used for fall protection in industrial environments. SRLs typically connect at one end to an anchorage point, often on a support structure at or near where a user is performing certain assigned tasks. The line from the SRL is connected (or otherwise attached) to a harness worn by the user. The SRLs include an engagement and braking arrangement in the housing of the SRLs that engage one another during an accidental fall, which prevents the SRL user from falling too far. Occasionally, energy absorbing devices external to the SRLs may be provided on the line from the SRL to assist in absorbing any additional energy that results from the accidental fall of the user to reduce the amount of force experienced by the user at the end of the fall. A few types of external energy absorbers include a "partially oriented yarn" (POY) or tear tape arrangement. These types of external energy absorbers, however, are not resettable in the field by the user and often need to be replaced after use. They are also both made of fabrics, and are currently unable to become solely made of metal or composite materials. Fabric elements may weather poorly as compared to metal or composite counterparts.

SUMMARY OF THE INVENTION

Accordingly, and generally, provided is an improved external energy absorber having a tolerance ring assembly.

In one preferred and non-limiting embodiment or aspect, an external energy absorber may include a hub having a line associated therewith, the line including a first end directly or indirectly attached to the hub and a second end opposite the first end, an energy absorbing arrangement directly or indirectly attached to the hub, the energy absorbing arrangement comprising an outer ring directly or indirectly attached to the hub, an inner ring directly or indirectly attached to a housing, and at least one energy absorbing member positioned between the outer ring and the inner ring, wherein the at least one energy absorbing member is configured to generate friction between the outer ring and the inner ring upon rotation of the hub, and the housing configured to contain the hub and energy absorbing arrangement.

In another preferred and non-limiting embodiment or aspect, the at least one energy absorbing member may include at least one tolerance ring. The at least one tolerance ring may include at least one projection that contacts one of the following: the inner ring, the outer ring, or both the inner ring and the outer ring, to generate friction between the inner ring and the outer ring. The at least one tolerance ring may be made of spring steel. The inner ring and the outer ring may be press fit together to capture the at least one energy absorbing member therebetween. The outer ring may be configured to rotate with the hub. The inner ring may be configured to remain stationary with respect to the housing. The hub may further include at least one protrusion configured to retain the first end of the line on the hub. The housing may include two separate housing members configured to connect to one another to contain the hub and the energy absorbing arrangement. The hub may be rotatable within the housing to facilitate extension of the line from the housing.

In another preferred and non-limiting embodiment or aspect, an external energy absorber for use with fall protection equipment may include a hub having a line associated therewith, the line including a first end directly or indirectly attached to the hub and a second end opposite the first end attached to a user, and at least one tolerance ring configured to generate friction upon rotation of the hub.

In another preferred and non-limiting embodiment or aspect, a housing may be configured to capture the hub and the at least one tolerance ring. The at least one tolerance ring may be directly or indirectly in contact with the hub and directly or indirectly in contact with the housing, and the at least one tolerance ring may be configured to generate friction between the hub and the housing upon rotation of the hub. The housing may include at least one inner protrusion upon which the hub and the at least one tolerance ring are positioned. The at least one tolerance ring may be held in a tolerance ring assembly including an outer ring, and an inner ring. The at least one tolerance ring may be positioned between the outer ring and the inner ring. The outer ring may define at least one notch. The hub may include at least one tab. The at least one notch of the outer ring may be configured to receive the at least one tab of the hub in a keyed relationship, such that the outer ring rotates with the hub. The outer ring may rotate relative to the inner ring. The inner protrusion of the housing may include at least one tab. The tolerance ring assembly may define at least one notch. The at least one notch of the inner protrusion may be configured to receive the at least one tab of the tolerance ring assembly in a keyed relationship. The at least one tolerance ring may include projections extending from at least one of the following: an inner surface, an outer surface, or the inner surface and the outer surface, to generate friction between the tolerance ring and at least one of the following: the inner ring, the outer ring, or the inner ring and the outer ring.

In another preferred and non-limiting embodiment or aspect, an external energy absorber for use with fall protection equipment, may include a hub having a line associated therewith, the line including a first end directly or indirectly attached to the hub and a second end opposite the first end attached to a user, a housing configured to contain the hub, and at least one tolerance ring integrally formed on either the hub or the housing.

Further preferred and non-limiting embodiments or aspects will now be described in the following numbered clauses.

Clause 1: An external energy absorber, comprising: a hub having a line associated therewith, the line including a first end directly or indirectly attached to the hub and a second end opposite the first end; an energy absorbing arrangement directly or indirectly attached to the hub, the energy absorbing arrangement comprising an outer ring directly or indirectly attached to the hub, an inner ring directly or indirectly attached to a housing, and at least one energy absorbing member positioned between the outer ring and the inner ring, wherein the at least one energy absorbing member is configured to generate friction between the outer ring and the inner ring upon rotation of the hub; and the housing configured to contain the hub and energy absorbing arrangement.

Clause 2: The external energy absorber of clause 1, wherein the at least one energy absorbing member comprises at least one tolerance ring.

Clause 3: The external energy absorber of clause 2, wherein the at least one tolerance ring includes at least one projection that contacts at least one of the following: the inner ring, the outer ring, or both the inner ring and the outer ring, to generate friction between the inner ring and the outer ring.

Clause 4: The external energy absorber of clause 2 or 3, wherein the at least one tolerance ring is made of spring steel.

Clause 5: The external energy absorber of any of clauses 1-4, wherein the inner ring and the outer ring are press fit together to capture the at least one energy absorbing member therebetween.

Clause 6: The external energy absorber of any of clauses 1-5, wherein the outer ring is configured to rotate with the hub.

Clause 7: The external energy absorber of any of clause 1-6, wherein the inner ring is configured to remain stationary with respect to the housing.

Clause 8: The external energy absorber of any of clauses 1-7, wherein the hub further comprises at least one protrusion configured to retain the first end of the line on the hub.

Clause 9: The external energy absorber of any of clauses 1-8, wherein the housing includes two separate housing members configured to connect to one another to contain the hub and the energy absorbing arrangement.

Clause 10: The external energy absorber of any of clauses 1-9, wherein the hub is rotatable within the housing to facilitate extension of the line from the housing.

Clause 11: An external energy absorber for use with fall protection equipment, comprising: a hub having a line associated therewith, the line including a first end directly or indirectly attached to the hub and a second end opposite the first end attached to a user; and at least one tolerance ring configured to generate friction upon rotation of the hub.

Clause 12: The external energy absorber of clause 11, further comprising a housing configured to capture the hub and the at least one tolerance ring.

Clause 13: The external energy absorber of clause 12, wherein the at least one tolerance ring is directly or indirectly in contact with the hub and directly or indirectly in contact with the housing, and wherein the at least one tolerance ring is configured to generate friction between the hub and the housing upon rotation of the hub.

Clause 14: The external energy absorber of either clause 12 or clause 13, wherein the housing includes at least one inner protrusion upon which the hub and the at least one tolerance ring are positioned.

Clause 15: The external energy absorber of any of clauses 12-14, wherein the at least one tolerance ring is held in a tolerance ring assembly comprising: an outer ring; and an inner ring; wherein the at least one tolerance ring is positioned between the outer ring and the inner ring.

Clause 16: The external energy absorber of clause 15, wherein the outer ring defines at least one notch, wherein the hub includes at least one tab, and wherein the at least one notch of the outer ring is configured to receive the at least one tab of the hub in a keyed relationship, such that the outer ring rotates with the hub.

Clause 17: The external energy absorber of either clause 15 or clause 16, wherein the outer ring rotates relative to the inner ring.

Clause 18: The external energy absorber of any of clauses 15-17, wherein the inner protrusion of the housing includes at least one tab, wherein the tolerance ring assembly defines at least one notch, and wherein the at least one notch of the inner protrusion is configured to receive the at least one tab of the tolerance ring assembly in a keyed relationship.

Clause 19: The external energy absorber of any of clauses 11-18, wherein the at least one tolerance ring includes projections extending from at least one of the following: an inner surface, an outer surface, or the inner surface and the outer surface, to generate friction between the tolerance ring and at least one of the following: the inner ring, the outer ring, or the inner ring and the outer ring.

Clause 20: An external energy absorber for use with fall protection equipment, comprising: a hub having a line associated therewith, the line including a first end directly or indirectly attached to the hub and a second end opposite the first end attached to a user; a housing configured to contain the hub; and at least one tolerance ring integrally formed on either the hub or the housing.

These and other features and characteristics of the present invention, as well as the parts, and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting. Further, it is to be understood that the invention may assume various alternative variations and step sequences, except where expressly specified to the contrary.

As illustrated in FIGS. 1-10, certain preferred and non-limiting embodiments or aspects of an external energy absorber 2 for use in industrial environments and recreational activities is provided. The external energy absorber 2 can be implemented in any appropriate application or environment where a user or worker engages in activities in an elevated position and requires some protection in the event of a fall. Further, in one preferred and non-limiting embodiment or aspect, the external energy absorber 2 of the present invention is in the form of a fall protection device. The external energy absorber 2 is configured to prevent the user from falling too far or stopping too quickly as discussed in greater detail below. In one preferred and non-limiting embodiment or aspect, the external energy absorber 2 may be used in conjunction with an additional fall protection device, such as a self-retracting lanyard (not shown). In one aspect, "external" energy absorber is understood to be an energy absorber 2 provided outside of or apart from a fall protection device used on a line 6.

Figure 1:
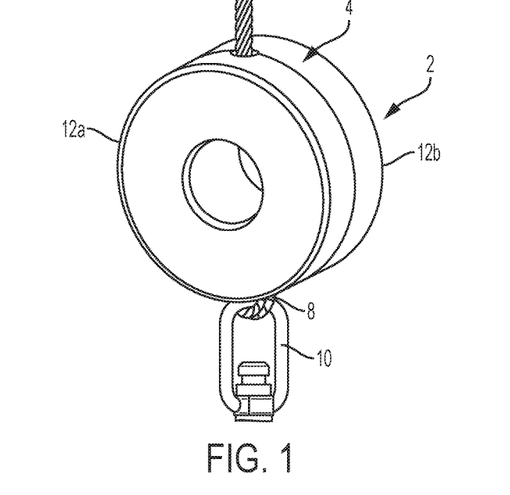
FIG. 1 is a perspective view of an external energy absorber according to one aspect of the present invention.

Referring to FIG. 1, and in one preferred and non-limiting embodiment or aspect, the external energy absorber 2 includes a housing 4 that may hold or be associated with a line 6, such as a lifeline, that extends therefrom. The housing 4 may have a generally cylindrical shape. As explained in greater detail below, the line 6 may be spooled within the housing 4, such that the line 6 may unwind from the housing 4 during use of the external energy absorber 2. In one preferred and non-limiting embodiment or aspect, one end of the line 6 may be retained within the housing 4, and an opposing end of the line 6 may be connected to a structure at or near where the user is working. It is also contemplated that the external energy absorber 2 may be held on a structure at or near where the user is working with one end of the line retained within the housing 4 and an opposing end of the line 6 connected to the user. In one preferred and non-limiting embodiment or aspect, a portion 8 of the line 6 may extend from an opposing end of the housing 4 and be configured to be attached to receive a portion of a connector 10, which is used to connect the external energy absorber 2 to a harness (not shown) or similar equipment on an individual using the external energy absorber 2. The portion 8 of the line 6 may be a loop of the line 6 that allows the connector 10 to be hooked or attached thereto.

Figure 2:
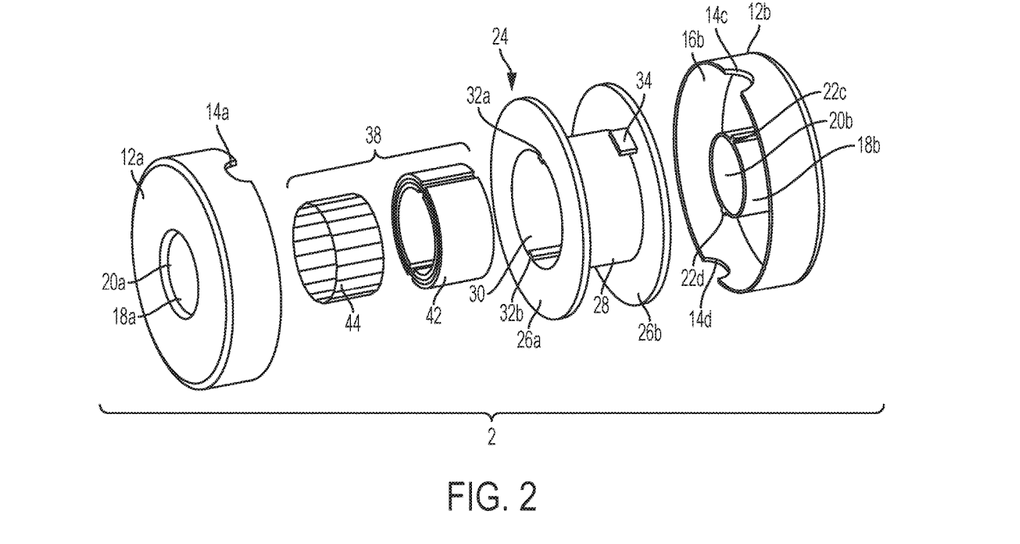
FIG. 2 is an assembly view of the external energy absorber of FIG. 1 according to one aspect of the present invention.
Figure 3:
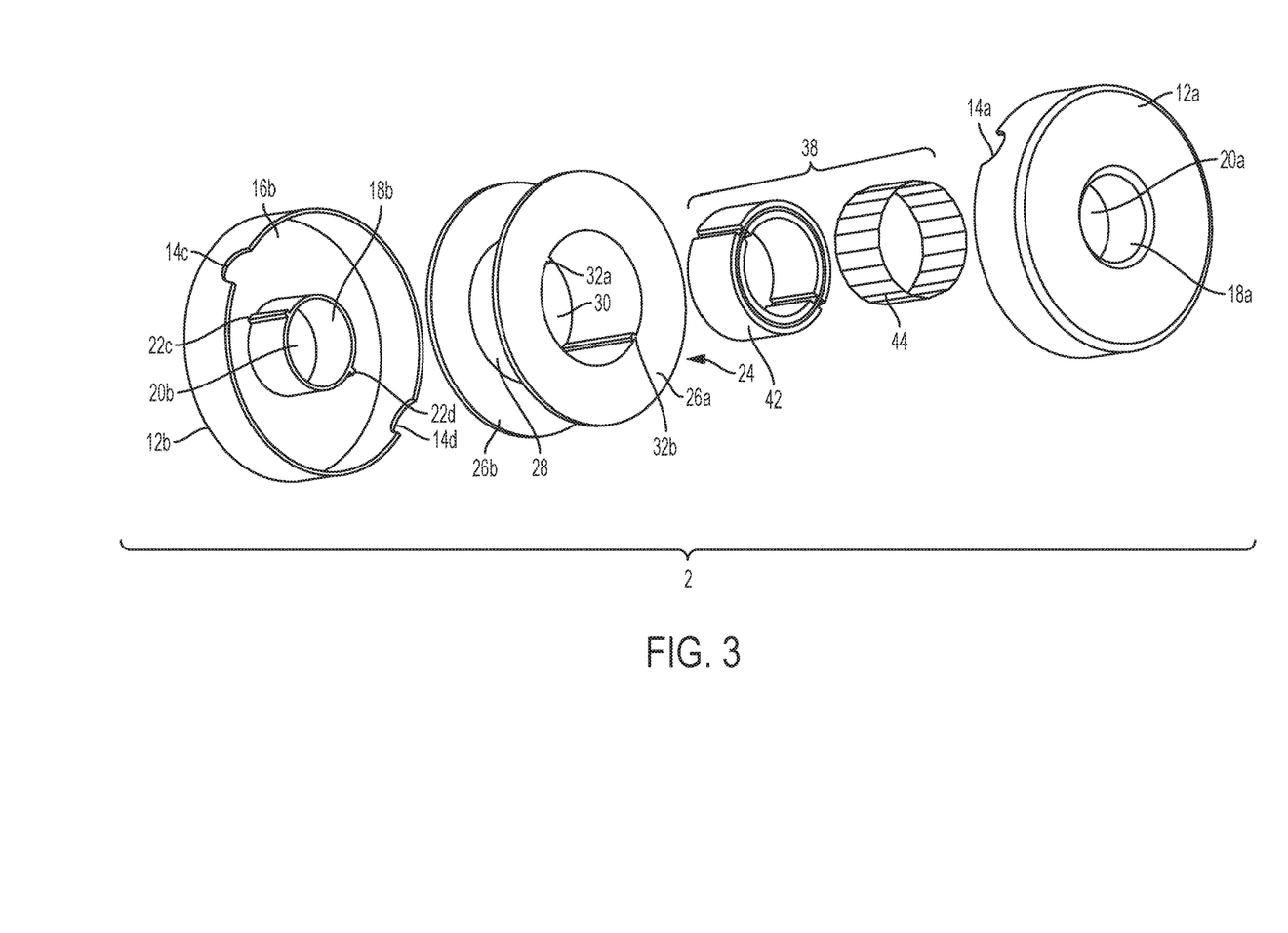
FIG. 3 is another assembly view of the external energy absorber of FIG. 1 according to one aspect of the present invention.

Referring to FIGS. 2 and 3, and in one preferred and non-limiting embodiment or aspect, the housing 4 may include two separate housing members 12a, 12b configured to fit together to at least partially enclose the line 6 within the housing 4. Each housing member 12a, 12b may form one half of the housing 4. The housing members 12a, 12b may be fit together using a plurality of different connecting arrangements. In one preferred and non-limiting embodiment or aspect, the housing members 12a, 12b may be removably attached together using a friction fit connection. In other preferred and non-limiting embodiments or aspects, the housing members 12a, 12b may be removably attached together using fasteners, latches, a snap-fit connection, or any other releasable connection arrangement that permits a user to connect and separate the housing members 12a, 12b from one another. In another preferred and non-limiting embodiment or aspect, the housing members 12a, 12b may be fixedly fit together by welding or adhesively attaching the housing members 12a, 12b to one another.

In one preferred and non-limiting embodiment or aspect, one housing member 12a may define at least one recess 14a, 14b and the other housing member 12b may define at least one recess 14c, 14d. When joined together, the two recesses 14a, 14c may form a circular opening that encloses the line 6 that extends from the housing 4. The other recesses 14b, 14d may form a circular opening that encloses at least a portion of the looped portion 8 of the line 6 used to attach the connector 10. In one preferred and non-limiting embodiment or aspect, each housing member 12a, 12b may define a cavity 16a, 16b configured to contain or house several components of the external energy absorber 2 when formed together, as described in further detail below.

Figure 5A:
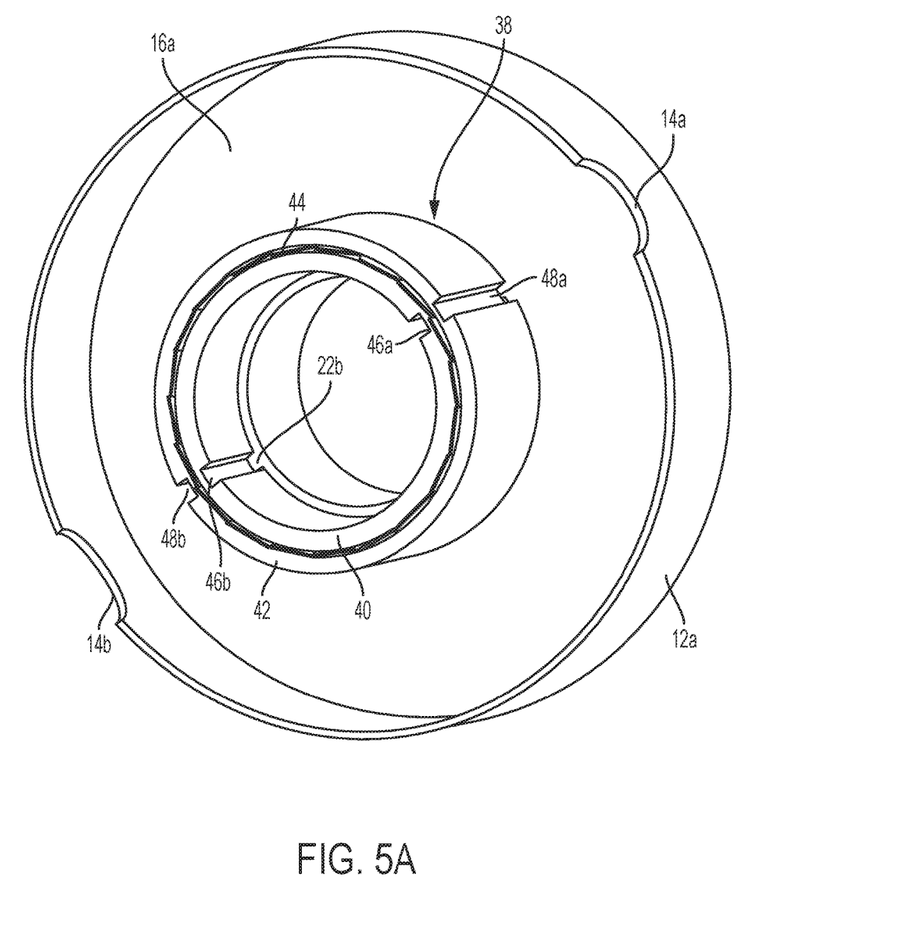
FIG. 5A is a perspective view of the tolerance ring assembly and housing of the external energy absorber of FIG. 1 according to one aspect of the present invention.
Figure 5B:
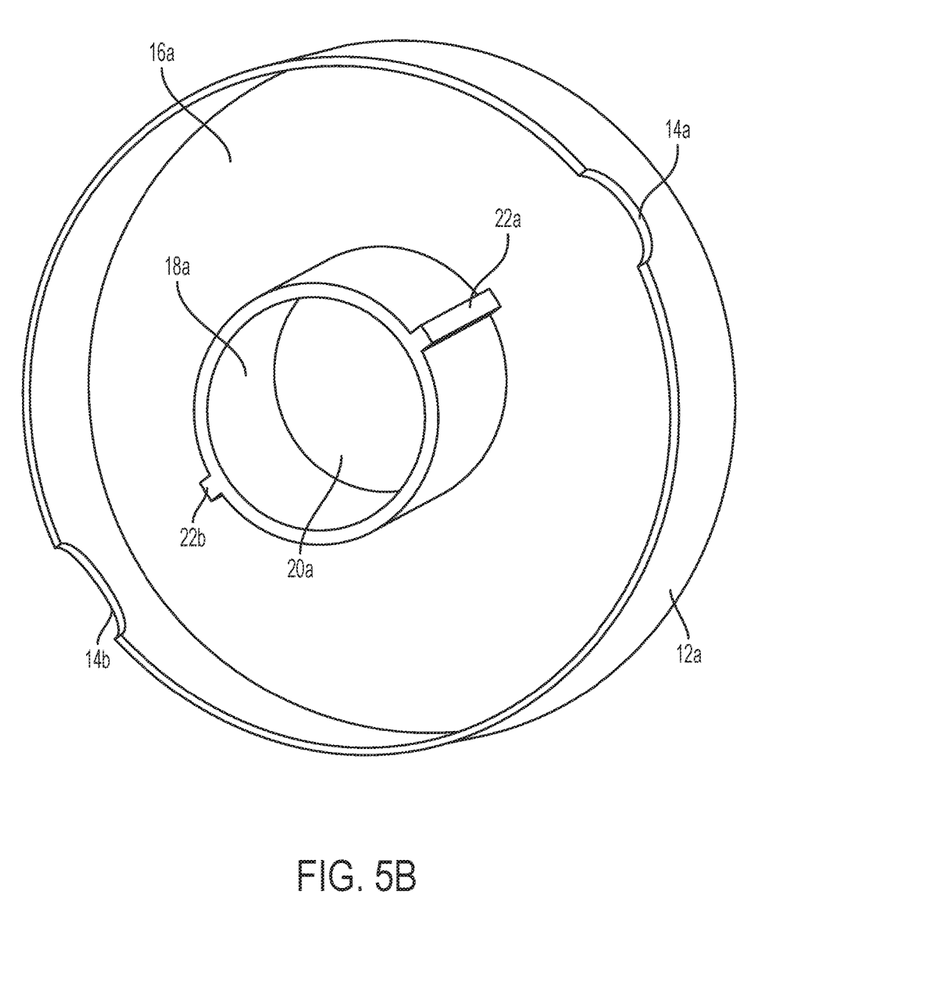
FIG. 5B is a perspective view of the housing of the external energy absorber of FIG. 1 according to one aspect of the present invention.
Figure 6:
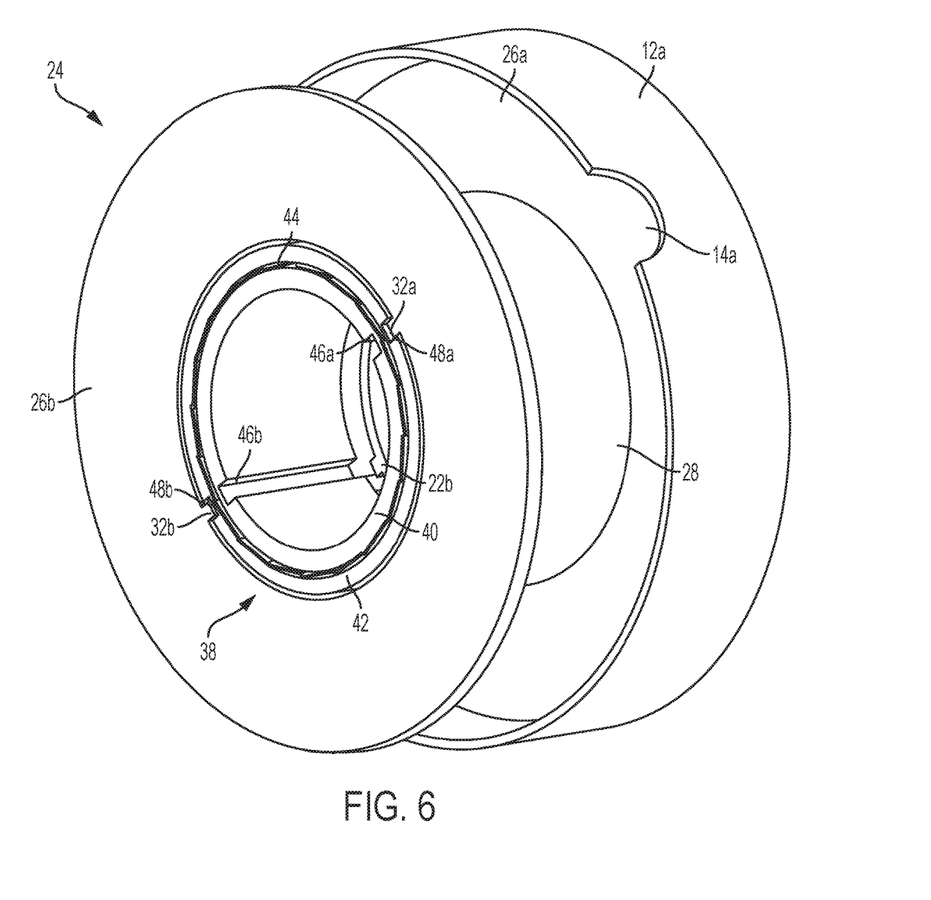
FIG. 6 is a perspective view of the hub and the tolerance ring assembly held within the housing of the external energy absorber of FIG. 1 according to one aspect of the present invention.

In one preferred and non-limiting embodiment or aspect, each housing member 12a, 12b may include an inner protrusion 18a, 18b that extends from an inner surface of each housing member 12a, 12b into the respective cavity 16a, 16b. In one preferred and non-limiting embodiment, the inner protrusions 18a, 18b may be substantially cylindrical and may define a cavity 20a, 20b therein. As shown in FIGS. 2, 3, and 5, each inner protrusion 18a, 18b may include at least one tab 22a, 22b, 22c, 22d that extends into the cavity

16a, 16b. In one preferred and non-limiting embodiment or aspect, each inner protrusion 18a, 18b may include two tabs 22a, 22b, 22c, 22d. The tabs 22a, 22b, 22c, 22d may be connected in a keyed relationship to other internal components of the external energy absorber 2, as described in greater detail below. In one preferred and non-limiting embodiment or aspect, a keyed relationship may be understood to be an interconnecting relationship between two components in which one component is received within another component. In one preferred and non-limiting embodiment or aspect, on each inner protrusion 18a, 18b, one tab 22a, 22c may be spaced substantially opposite from a corresponding tab 22b, 22d. It is to be understood, however, that the tabs 22a, 22b, 22c, 22d on each inner protrusion 18a, 18b may be spaced at any distance from one another.

Referring to FIGS. 2 and 3, and in one preferred and non-limiting embodiment or aspect, a hub 24 may be received within the housing 4. The hub 24 may be substantially cylindrical in shape to correspond to the shape of the cavities 16a, 16b of the housing members 12a, 12b. The hub 24 may include two outer plates 26a, 26b joined together by a base member 28. The outer plates 26a, 26b and the base member 28 may define a cylindrical cavity 30 that extends from one outer plate 26a to the opposing outer plate 26b. In one preferred and non-limiting embodiment or aspect, when the housing members 12a, 12b are joined together, the hub 24 may be held on the inner protrusions 18a, 18b, which extend through the cavity 30 defined by the outer plates 26a, 26b and base member 28.

Figure 4:
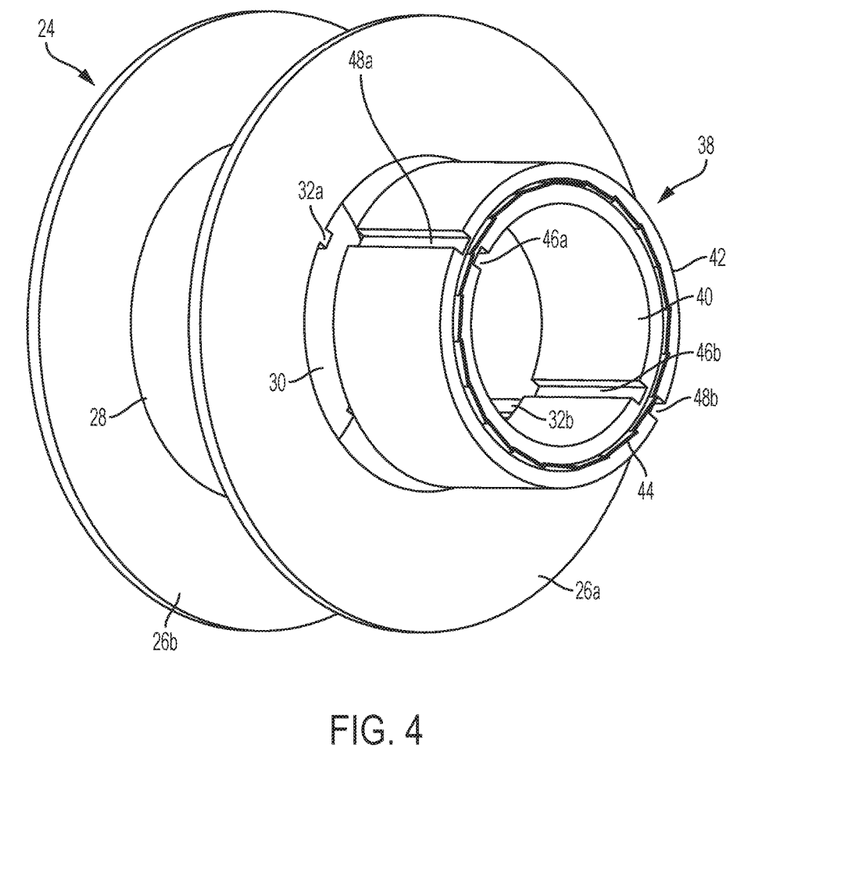
FIG. 4 is a perspective view of a hub and tolerance ring assembly of the external energy absorber of FIG. 1 according to one aspect of the present invention.
Figure 10:
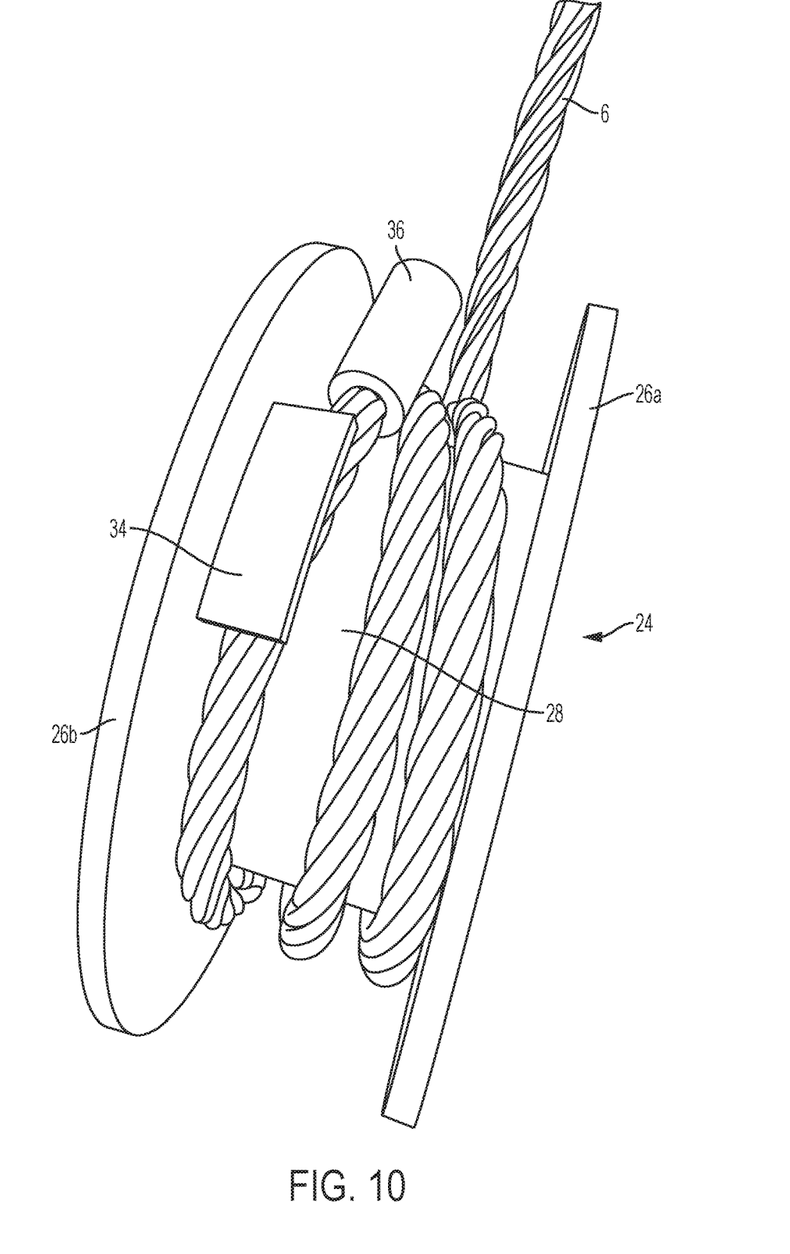
FIG. 10 is a perspective view showing a line wound on the hub of the external energy absorber of FIG. 1 according to one aspect of the present invention.

Referring to FIGS. 2-4, in one preferred and non-limiting embodiment or aspect, at least one tab 32a, 32b may extend from an inner surface of the outer plates 26a, 26b and the base member 28 into the cavity 30. In another preferred and non-limiting embodiment or aspect, two tabs 32a, 32b extend from an inner surface of the outer plates 26a, 26b and the base member 28 into the cavity 30. The tabs 32a, 32b may be configured to connect in a keyed relationship with other internal components of the external energy absorber 2, as described in greater detail below. In one preferred and non-limiting embodiment or aspect, the hub 24 may also include a protrusion 34 that extends from an inner surface of one of the outer plates 26a, 26b. As shown in FIG. 10, when the external energy absorber 2 is fully assembled, the line 6 may be wound around the base member 28. One end of the line 6 may be wound underneath the protrusion 34 and may have a cap 36 provided thereon. In one preferred and non-limiting embodiment or aspect, the cap 36 may have a diameter greater than the distance between the protrusion 34 and the base member 28, such that the cap 36 and corresponding end of the line 6 cannot be pulled past the protrusion 34, thereby preventing the line 6 from being completely pulled out of the housing 4. It is to be understood that the protrusion 34 may be provided on either outer plate 26a, 26b.

Referring to FIGS. 2-5, and in one preferred and non-limiting embodiment or aspect, the external energy absorber 2 may include an energy absorbing arrangement, hereinafter referred to as a tolerance ring assembly 38, configured to provide a controlled amount of friction between two surfaces in the external energy absorber 2 to absorb energy and reduce the impact of a user's fall. The tolerance ring assembly 38 may be substantially cylindrical and may be received within the cavity 30 of the hub 24 when the external energy absorber 2 is fully assembled.

In one preferred and non-limiting embodiment or aspect, the tolerance ring assembly 38 may include an inner ring 40, an outer ring 42, and at least one energy absorbing member, hereinafter referred to as a tolerance ring 44, positioned between the inner ring 40 and the outer ring 42. It should be noted that the tolerance ring 44 may include or be in the form of multiple tolerance rings or other energy absorbing materials, depending upon the amount of energy absorption (or friction) required. The inner ring 40 and the outer ring 42 may be rotatable relative to one another. The tolerance ring 44 may be press fit between the inner ring 40 and the outer ring 42. In one preferred and non-limiting embodiment or aspect, the inner ring 40 may define at least one notch 46a, 46b on an inner surface thereof, the at least one notch 46a, 46b being configured to establish a keyed relationship with the tabs 22a, 22b, 22c, 22d on the inner protrusions 18a, 18b of the housing members 12a, 12b. In another preferred and non-limiting embodiment or aspect, the inner ring 40 may define two notches 46a, 46b. The notches 46a, 46b may be defined opposite one another in the inner ring 40. It is to be understood, however, that the notches 46a, 46b may be spaced at any distance from one another. In one preferred and non-limiting embodiment or aspect, the position of the notches 46a, 46b on the inner ring 40 and the tabs 22a, 22b, 22c, 22d on the inner protrusions 18a, 18b of the housing members 12a, 12b may correspond to one another to create the keyed relationship for positioning the tolerance ring assembly 38 on the housing members 12a, 12b.

In one preferred and non-limiting embodiment or aspect, the outer ring 42 may define at least one notch 48a, 48b on an outer surface thereof, the at least one notch 48a, 48b being configured to establish a keyed relationship with the tabs 32a, 32b on the hub 24. In another preferred and non-limiting embodiment or aspect, the outer ring 42 may define two notches 48a, 48b. The notches 48a, 48b may be defined opposite one another in the outer ring 42. It is to be understood, however, that the notches 48a, 48b may be spaced at any distance from one another. In one preferred and non-limiting embodiment or aspect, the position of the notches 48a, 48b on the outer ring 42 and the tabs 32a, 32b on the hub 24 may correspond to one another to create the keyed relationship for positioning the tolerance ring assembly 38 within the cavity 30 of the hub 24.

Figure 7A:
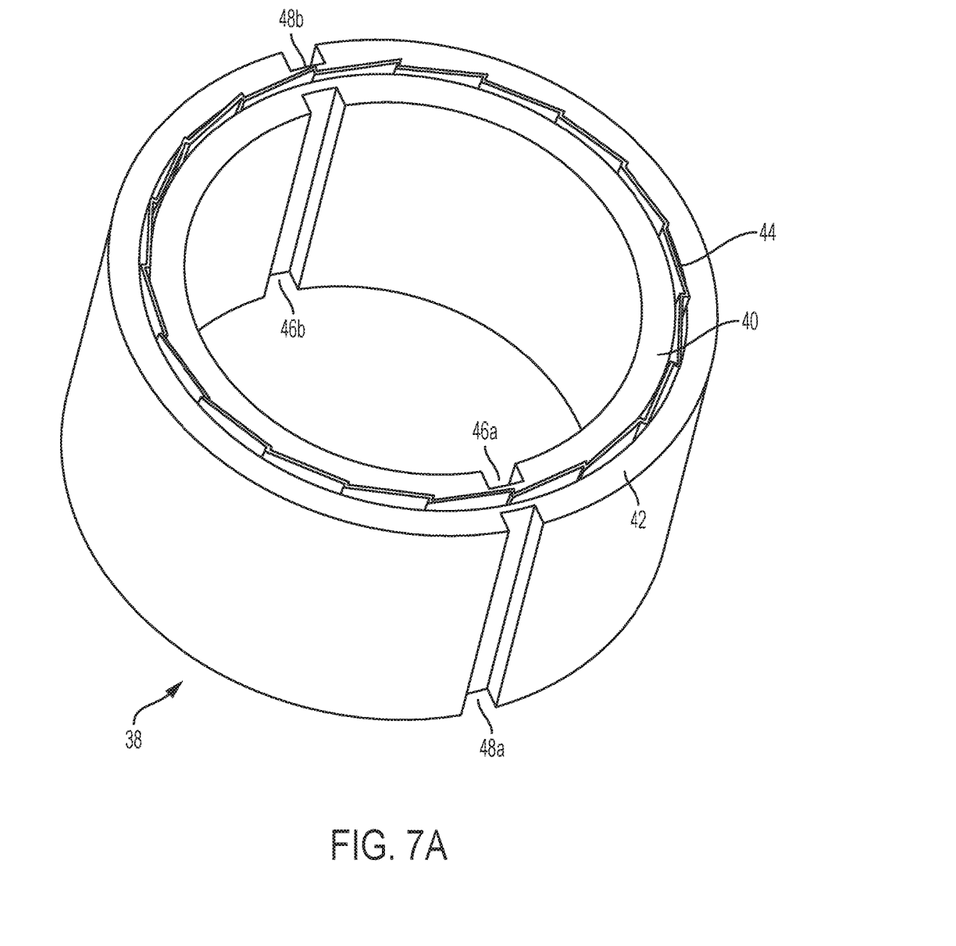
FIG. 7A is a perspective view of the tolerance ring assembly of the external energy absorber of FIG. 1 according to one aspect of the present invention.
Figure 7B:
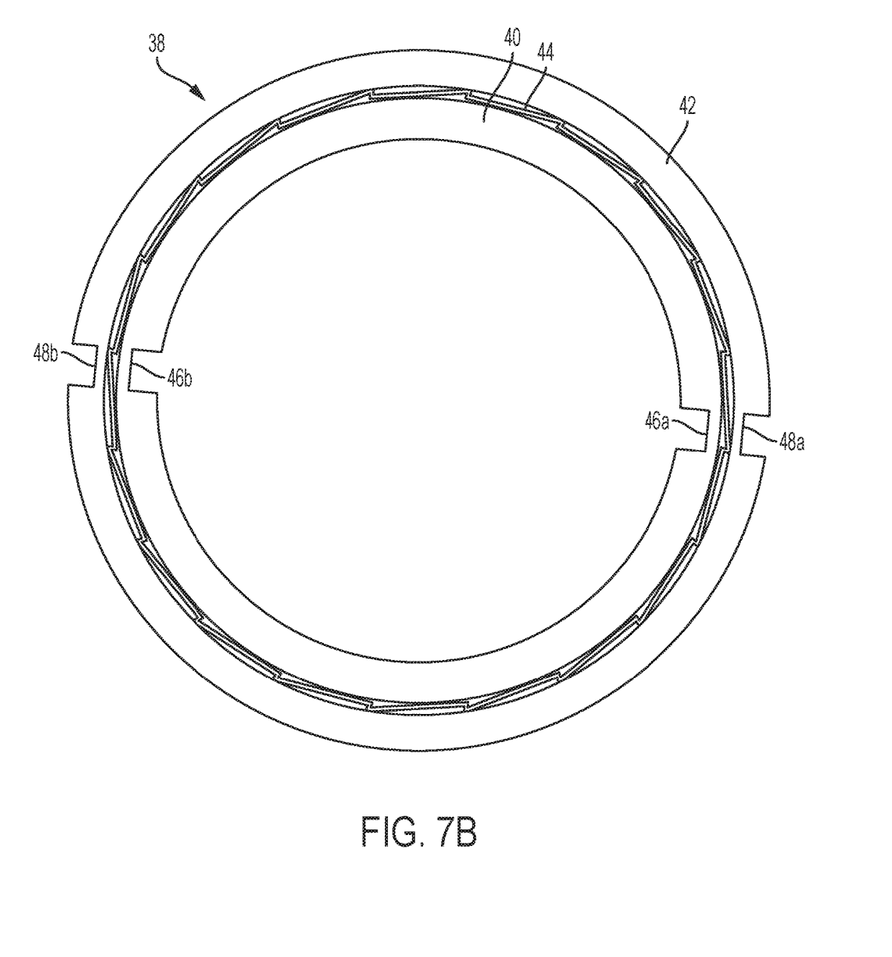
FIG. 7B is a front view of the tolerance ring assembly of the external energy absorber of FIG. 1 according to one aspect of the present invention.
Figure 8:
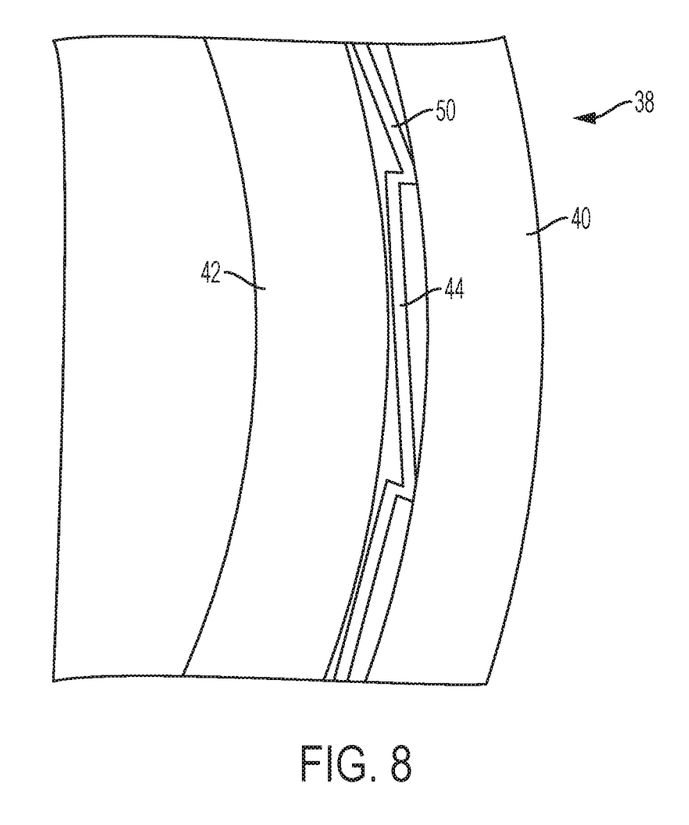
FIG. 8 is an exploded view of the tolerance ring assembly of FIG. 7A according to one aspect of the present invention.
Figure 9:
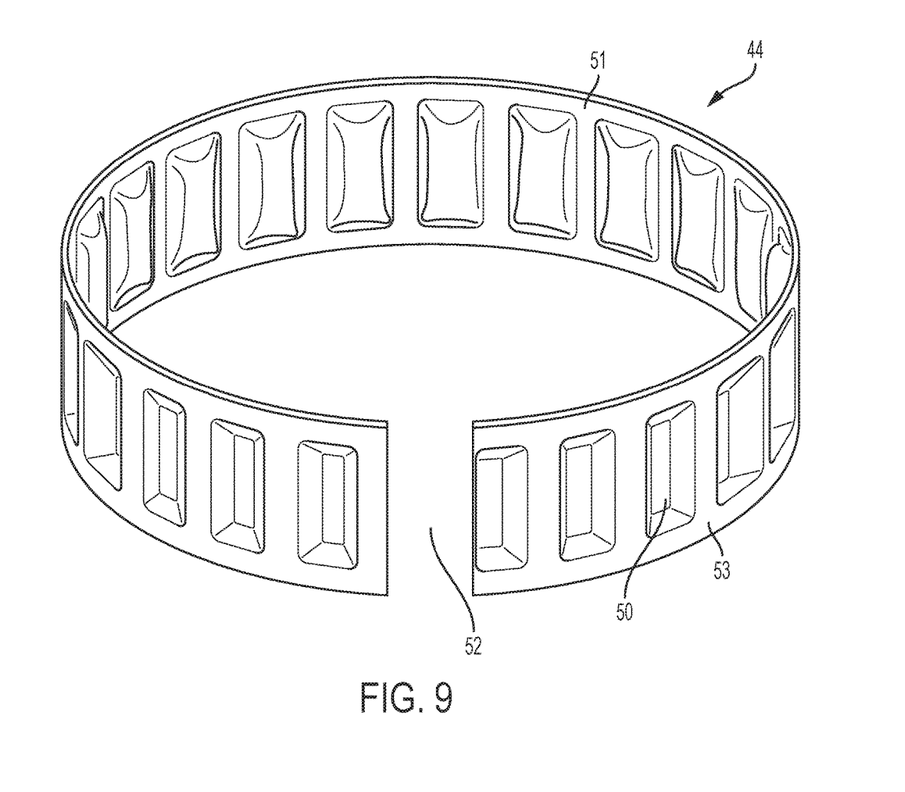
FIG. 9 is a perspective view of the tolerance ring of the tolerance ring assembly of FIG. 7A according to one aspect of the present invention.

Referring to FIGS. 7-9, and in one preferred and non-limiting embodiment or aspect, the tolerance ring 44 may be positioned within the tolerance ring assembly 38 between the inner ring 40 and the outer ring 42. The tolerance ring 44 may have a greater diameter than the inner ring 40, and the outer ring 42 may have a greater diameter than the tolerance ring 44. In one preferred and non-limiting embodiment or aspect, the tolerance ring 44 may be made of a spring steel material. Referring to FIGS. 7 and 8, and in one preferred and non-limiting embodiment or aspect, the tolerance ring 44 may include projections 50 that alternately extend from an outer surface of the tolerance ring 44 and an inner surface of the tolerance ring 44. A projection 50 that extends from an outer surface of the tolerance ring 44 may be formed adjacent a projection 50 that extends from an inner surface of the tolerance ring 44. In one preferred and non-limiting embodiment or aspect, the projections 50 may be formed in a wave-like arrangement on the inner and/or outer surface of the tolerance ring 44. The projections 50 extend a sufficient length so as to contact either an inner surface of the outer ring 42, an outer surface of the inner ring 40, or both. Therefore, and in one preferred and non-limiting embodiment or aspect, as the inner ring 40 rotates relative to the outer ring 42, the projections 50 of the tolerance ring 44 create friction between the tolerance ring 44 and the inner ring 40 and/or the outer ring 42 to absorb energy from the relative rotation of the inner ring 40 and/or the outer ring 42.

Referring to FIG. 9, and in one preferred and non-limiting embodiment or aspect, the tolerance ring 44 may also include projections 50 that only extend from an inner surface 51 of the tolerance ring 44 to contact the outer surface of the inner ring 40. It is also contemplated that the outer surface of the tolerance ring 44 in this embodiment or aspect may contact the inner surface of the outer ring 42 to create friction between using projections 50 oriented or positioned on an outer surface 53 of the tolerance ring 44. The tolerance ring 44 may also have a gap 52 that permits adjustment of the diameter of the tolerance ring 44 due to potential bending forces within the tolerance ring assembly 38. Still further, the shape and/or spacing of these projections 50 may be configured or arranged to adjust the amount of friction effected during operation.

Referring to FIGS. 2-6 and 10, and in one preferred and non-limiting embodiment or aspect, the assembly of the external energy absorber 2 is described. The end of the line 6 that includes the cap 36 may be inserted underneath the protrusion 34 on the hub 24. Subsequently, the rest of the line 6 may be wound around the base member 28 of the hub 24. The tolerance ring assembly 38 may then be inserted into the cavity 30 defined by the hub 24. The tabs 32a, 32b on the hub 24 are received within the notches 48a, 48b defined in the outer ring 42 of the tolerance ring assembly 38. The assembled hub 24 and tolerance ring assembly 38 may then be positioned on an inner protrusion 18b of one of the housing members 12b. The tabs 22c, 22d of the inner protrusion 18b may be received within the notches 46a, 46b defined in the inner ring 40 of the tolerance ring assembly 38. In this arrangement, the tolerance ring assembly 38 is positioned between the base member 28 of the hub 24 and the inner protrusion 18b of the housing member 12b. The line 6 may then be positioned within the recess 14c defined in the housing member 12b. The opposing housing member 12a may then be connected to the housing member 12b upon which the hub 24 and the tolerance ring assembly 38 are held. The inner protrusion 18a of the housing member 12a may be inserted into the inner ring 40 of the tolerance ring assembly 38 by guiding the tabs 22a, 22b into the notches 46a, 46b defined in the inner ring 40. The housing members 12a, 12b may be pushed together to connect with one another and enclose the line 6 within the recesses 14a, 14c.

Referring to FIGS. 4-8, and in one preferred and non-limiting embodiment or aspect, an operation of the external energy absorber 2 is described. In one preferred and non-limiting embodiment or aspect, the tolerance ring 44 may be used as an energy absorbing component in the external energy absorber 2. During an event in which a force acts on one of the inner ring 40 or the outer ring 42 of the tolerance ring assembly 38 in a tangential direction and the other component is fixed, the tolerance ring 44 provides a controlled amount of friction between the inner ring 40 or the outer ring 42 and the tolerance ring 44 to absorb the increased energy in the external energy absorber 2 and decreases the rate of descent of the user attached to the line 6 in a gradual or smooth manner.

In one preferred and non-limiting embodiment or aspect, the inner ring 40 of the tolerance ring assembly 38 may be held stationary within the housing 4 due to the inner ring 40 being positioned in a keyed relationship with the inner projections 18a, 18b of the housing 4. In this preferred and non-limiting embodiment or aspect, the outer ring 42 may be rotatable relative to the inner ring 40 due to the keyed relationship between the outer ring 42 and the hub 24. As the line 6 attached to the user is pulled out of the housing 4 during a fall event, the hub 24 may rotate within the housing 4 to extend the line 6 therefrom. Since the outer ring 42 is positioned in a keyed relationship with the hub 24, the outer ring 42 also rotates within the housing 4 as the line 6 is pulled therefrom. During the fall event in which the line 6 is pulled from the housing 4, the housing 4 does not rotate with respect to the hub 24 since the housing 4 may be attached to the connector 10 on the user's harness and continually moves with the user during the fall event. Based on the rotation of the inner ring 40 relative to the outer ring 42, the tolerance ring 44 creates friction due to contact with the inner ring 40 and/or the outer ring 42. The friction created by the tolerance ring 44 assists in decelerating the rotation of the hub 24 and, thereby, the unwinding of the line 6 from the housing 4. In the event the user is quickly falling, the rotation of the hub 24 may be quicker, which will result in a faster rotation of the outer ring 42 relative to the inner ring 40, which will cause the tolerance ring 44 to generate more friction between the outer ring 42 and the inner ring 40. Therefore, based on the increased amount of friction created by the tolerance ring 44, the user's quicker descent may be slowed at a greater rate. The friction generated by the tolerance ring 44 provides a smoother reduction in the user's rate of descent, which assists in preventing a sudden, abrupt stop for the user when the line 6 in the housing 4 has been fully extended from the housing 4. Based on the rate of the descent of the user on the line 6, the amount of friction generated by the tolerance ring 44 will vary. During normal operation of the external energy absorber 2 in which the user is descending at a slow, constant, controlled rate, the amount of friction generated by the tolerance ring 44 may be relatively low. During a fall event in which the user is descending at a faster, uncontrolled rate, the amount of friction generated by the tolerance ring 44 is increased to a higher amount, which allows the external energy absorber 2 to absorb more energy and reduce the rate of the user's descent.

The tolerance ring 44 used in the tolerance ring assembly 38 may be preferable over other types of energy absorbing components used in fall protection devices. The tolerance ring 44 is typically lower in cost, more resistant to weather conditions, and is smaller in profile. Since the tolerance ring 44 may be smaller in profile than other energy absorbing components, the overall footprint of the external energy absorber 2 can also be reduced, which can reduce the chances that the external energy absorber 2 snags or catches on an object in the environment in which the user is working.

Figure 11:
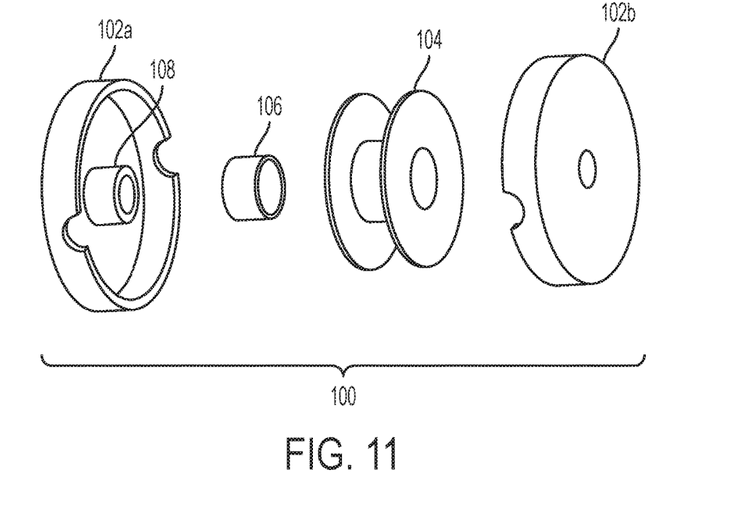
FIG. 11 is an assembly view of an external energy absorber according to one aspect of the present invention.
Figure 12:
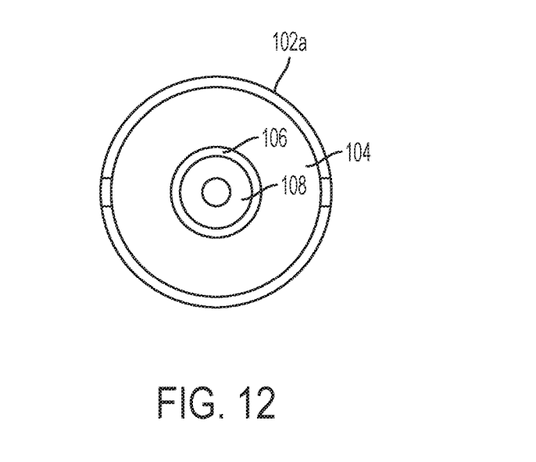
FIG. 12 is a side view of the external energy absorber of FIG. 11 with one half of the housing removed according to one aspect of the present invention.

Referring to FIGS. 11 and 12, and according to one preferred and non-limiting embodiment or aspect, the external energy absorber 100 may include a housing 102a, 102b, a hub 104, and a tolerance ring 106. The housing 102a, 102b and the hub 104 are similar to the housing 12a, 12b and the hub 24 used in the external energy absorber 2 described above. This embodiment or aspect of the external energy absorber 100, however, does not include a tolerance ring assembly, but merely uses a tolerance ring 106 (also referred to as an energy absorbing member) positioned between the housing 102a, 102b and the hub 104. The tolerance ring 106 may be positioned on an inner protrusion 108 that extends from the housing 102a. Once the tolerance ring 106 has been positioned on the housing 102a, the hub 104 may be placed on the tolerance ring 106. The tolerance ring 106 may be similar to the tolerance ring 44 used in the external energy absorber 2 described above. Based on the position of the tolerance ring 106 between the inner protrusion 108 and the hub 104, upon rotation of the hub 104 relative to the housing 102a, 102b, the tolerance ring 106 creates a frictional force between the inner protrusion 108 and the hub 104 to absorb the energy created by the rotation of the hub 104 within the housing 102a, 102b. This embodiment or aspect of the external energy absorber 2 absorbs the energy created by the rotation of the hub 104 within the housing 102a, 102b without the need for a tolerance ring assembly that includes an inner ring and an outer ring.

According to another preferred and non-limiting embodiment or aspect, the tolerance ring 106 may be integrally provided on either the housing 102 or the hub 104. The tolerance ring 106 may be formed on the housing 102 or the hub 104 or may be attached through welding, adhesives, or fasteners, among other attachment arrangements. With the tolerance ring 106 integrally provided on the housing 102, the tolerance ring 106 may create a frictional force between the housing 102 and the hub 104 as the hub 104 rotates within the housing 102 to absorb the energy created by the rotation of the hub 104. With the tolerance ring 106 integrally provided on the hub 104, the tolerance ring 106 may rotate with the hub 104 relative to the housing 102 to create a frictional force between the housing 102 and the hub 104.

An additional consideration in fall protection technology is a leading edge application. Many industrial falls occur over the edge of a working surface, which causes the line of the fall protection device to bend up to 90 degrees over the edge. In a leading edge situation, it is often critical that the energy absorption element be at the end of the line attached to the user. In the event this is not the case, there is a risk that the line will break and/or the user will be exposed to dangerously high stopping forces. By using a tolerance ring assembly 38 in an external energy absorber 2, many of the risks of leading edge situation can be avoided due to the ability to ensure that the external energy absorber 2 is provided near the end of the line 6 attached to the user. In the event a metallic line is used for the fall protection device, the external energy absorber 2 provides the only external energy absorber for a fall protection device used in connection with a non-textile line, such as a metallic line. In one preferred and non-limiting embodiment or aspect, the external energy absorber 2 may be resettable by the user in the field, which is not an option for other external energy absorbers, such as "partially oriented yarn" or tear tape arrangements. After the line 6 has been fully extended from the housing 4, the user may open the housing 4 and rewind the line 6 around the hub 24 to reset the external energy absorber 2.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. An external energy absorber, comprising:
   a hub having a line associated therewith, the line including a first end directly or indirectly attached to the hub and a second end opposite the first end;
   an energy absorbing arrangement directly or indirectly attached to the hub, the energy absorbing arrangement comprising an outer ring directly or indirectly attached to the hub, an inner ring directly or indirectly attached to a housing, and at least one energy absorbing member positioned between the outer ring and the inner ring, wherein the at least one energy absorbing member is configured to generate friction between the outer ring and the inner ring upon rotation of the hub; and
   the housing configured to contain the hub and the energy absorbing arrangement,
   wherein at least one inner protrusion of the housing includes at least one tab,
   wherein the energy absorbing arrangement defines at least one notch, and
   wherein the at least one notch of the energy absorbing arrangement is configured to receive the at least one protrusion of the housing in a keyed relationship.

2. The external energy absorber of claim 1, wherein the at least one energy absorbing member comprises at least one tolerance ring.

3. The external energy absorber of claim 2, wherein the at least one tolerance ring includes at least one projection that contacts at least one of the following: the inner ring, the outer ring, or both the inner ring and the outer ring, to generate friction between the inner ring and the outer ring.

4. The external energy absorber of claim 2, wherein the at least one tolerance ring is made of spring steel.

5. The external energy absorber of claim 1, wherein the inner ring and the outer ring are press fit together to capture the at least one energy absorbing member therebetween.

6. The external energy absorber of claim 1, wherein the outer ring is configured to rotate with the hub.

7. The external energy absorber of claim 1, wherein the inner ring is configured to remain stationary with respect to the housing.

8. The external energy absorber of claim 1, wherein the hub further comprises at least one protrusion configured to retain the first end of the line on the hub.

9. The external energy absorber of claim 1, wherein the housing includes two separate housing members configured to connect to one another to contain the hub and the energy absorbing arrangement.

10. The external energy absorber of claim 1, wherein the hub is rotatable within the housing to facilitate extension of the line from the housing.

11. An external energy absorber for use with fall protection equipment, comprising:
   a hub having a line associated therewith, the line including a first end directly or indirectly attached to the hub and a second end opposite the first end attached to a user;
   at least one tolerance ring configured to generate friction upon rotation of the hub, wherein the at least one tolerance ring is held in a tolerance ring assembly comprising an outer ring and an inner ring, wherein the at least one tolerance ring is positioned between the outer ring and the inner ring, and
   a housing configured to capture the hub and the at least one tolerance ring,
   wherein at least one inner protrusion of the housing includes at least one tab,
   wherein the tolerance ring assembly defines at least one notch, and
   wherein the at least one notch of the tolerance ring assembly is configured to receive the at least one protrusion of the housing in a keyed relationship.

12. The external energy absorber of claim 11,
wherein the at least one tolerance ring is directly or indirectly in contact with the hub and directly or indirectly in contact with the housing, and
wherein the at least one tolerance ring is configured to generate friction between the hub and the housing upon rotation of the hub.

13. The external energy absorber of claim 11, wherein the housing includes the at least one inner protrusion upon which the hub and the at least one tolerance ring are positioned.

14. The external energy absorber of claim 11,
wherein the outer ring defines at least one notch,
wherein the hub includes at least one tab, and
wherein the at least one notch of the outer ring is configured to receive the at least one tab of the hub in a keyed relationship, such that the outer ring rotates with the hub.

15. The external energy absorber of claim 11, wherein the outer ring rotates relative to the inner ring.

16. The external energy absorber of claim 11, wherein the at least one tolerance ring includes projections extending from at least one of the following: an inner surface, an outer surface, or the inner surface and the outer surface, to generate friction between the tolerance ring and at least one of the following: the inner ring, the outer ring, or the inner ring and the outer ring.

* * * * *